3,074,272
DEVICE FOR COMPENSATING FOR TEMPERATURE CHANGES IN A HYDRAULIC SYSTEM
James O. Melton, Norman, and Irvin M. Carpenter, Oklahoma City, Okla., assignors, by mesne assignments, to The Geolograph Company, Oklahoma City, Okla., a corporation of Oklahoma
Filed June 4, 1957, Ser. No. 663,509
1 Claim. (Cl. 73—141)

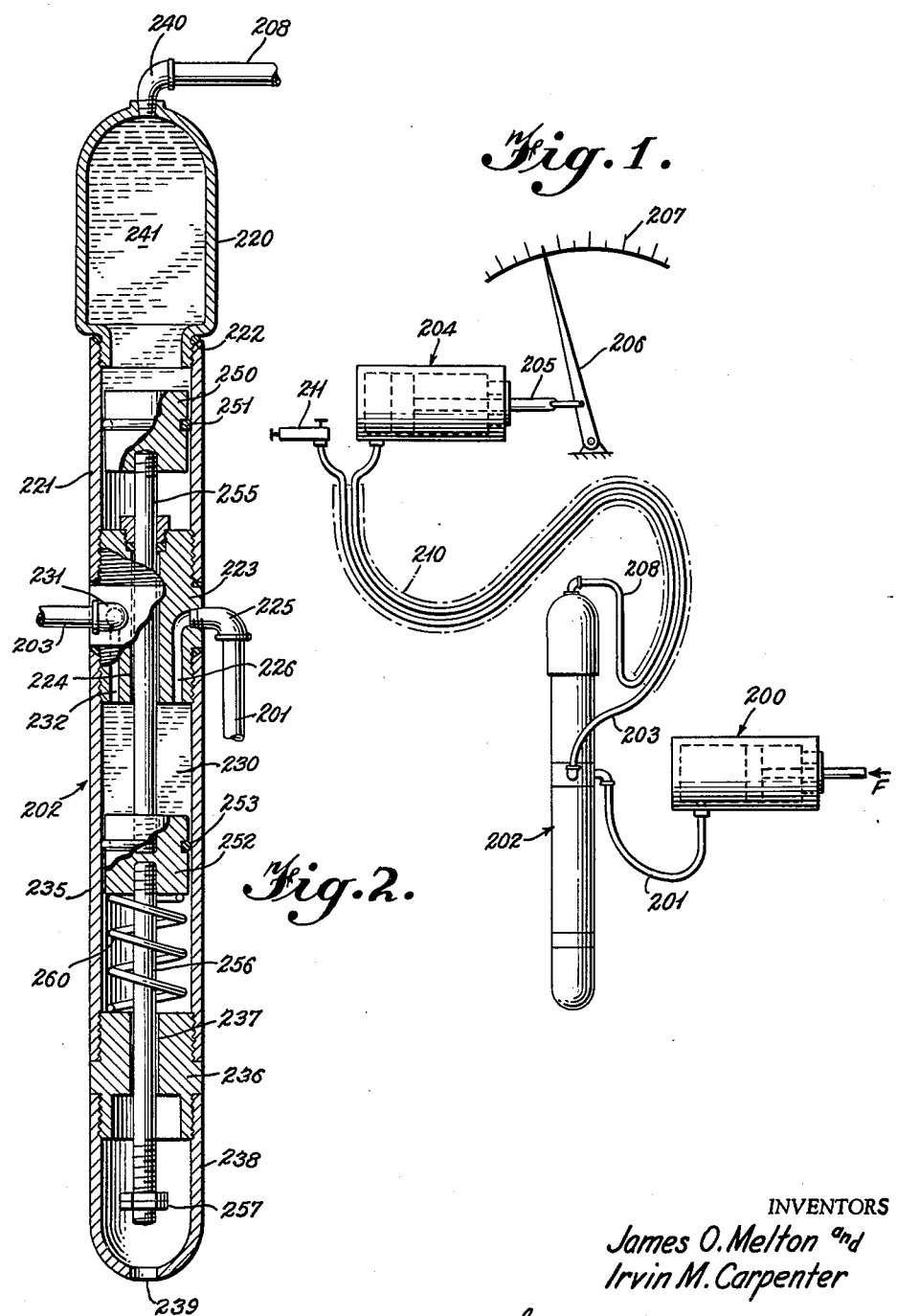

This invention relates to a device for compensating for temperature changes in a closed hydraulic system. More particularly, this invention relates to compensating a weight indicating system for a drill rig or derrick for temperature changes to render the system more accurate. This invention constitutes an improvement to the weight indicating apparatus disclosed in co-pending application S.N. 551,004, filed December 5, 1955.

In a closed hydraulic system for any measuring device, the expansion and contraction of fluid due to temperature changes can produce a serious error. It is a well recognized fact that fluid in the system changes with variations of atmospheric temperature.

An object of the invention is to provide, in a closed fluid system, equipment for compensating for changes in the volume of fluid in the system due to changes in atmospheric temperature whereby the system will be compensated and will not give erroneous results.

Another object of the invention is to provide a mechanism for use in conjunction with a closed hydraulic servo system which will automatically and continuously indicate with high accuracy the load maintained on the system regardless of fluctuations in temperature.

Another object of the invention is to provide a closed hydraulic servo system mechanism, in combination with a means for detecting the weight or stress placed upon a derrick, drill rig or part thereof, which maintains its accuracy despite changes in temperature and which at the same time is of simple construction and may be readily installed and serviced in the field.

Further objects and advantages will become apparent from the description of the invention in the specification taken in conjunction with the annexed drawings, and from the appended claim.

In the drawings:
FIGURE 1 shows a temperature compensator constructed in accordance with the present invention used in combination with a sensing means and an indicating means; and
FIGURE 2 is a view in section, and on an enlarged scale, of the temperature compensator shown in FIGURE 1.

Referring to the drawings in detail, in FIGURE 1, there is shown a sensing unit 200, consisting of a piston and cylinder assembly functioning as the input end of a closed hydraulic system. The sensing unit 200 is connected via a conduit 201 to a capsule designated as 202. A further conduit 203 leads from the capsule 202 to an indicating unit 204, consisting of a piston and cylinder assembly and functioning as the output end of the closed hydraulic system. The indicating unit 204 is connected by a link 205 to an indicating means consisting of a pivotally mounted pointer 206 and a calibrated scale 207. A fluid filled temperature line 208 is connected to the capsule 202 and extends for a length equal to the combined lengths of lines 201 and 203. The line 208 extends with the line 203, as indicated, and the two are enclosed together in a suitable covering, as indicated by 210, which may be a rubber covering. A fill and bleeder device 211 is connected to the end of line 208.

A better understanding of the structure and function of capsule 202 will be had by reference to FIGURE 2. The capsule 202 consists of an enlarged cap portion 220 threadedly engaged with a sleeve 221. An O-ring 222 serves as a seal means in the connection. The sleeve 221, at its lower end, is threadedly engaged with a plug member 223 defining a coaxial bore 224. The line 201 is connected by means of a suitable fitting 225 to communicate with an axial bore 226 defined in the plug member 223. The bore 226 opens into the space defined below plug member 223. This space is designated by the numeral 230. The line 203 is connected by means of a suitable fitting 231 to the plug member 223 and communicates with an axial bore 232 defined by plug member 223 that also opens into space 230. A sleeve 235 is threadedly engaged with the lower end of plug member 223 and a suitable seal is provided. A further plug member 236 is threadedly engaged with the lower end of sleeve 235 and defines a coaxial bore 237. A lower cap 238 is threadedly engaged with the lower end of plug member 236. A drain hole 239 is defined in the bottom of the lower cap 238.

The line 208 is connected by a suitable fitting 240 to the top of the cap 220 and is in communication with space 241 defined within the cap 220.

A piston 250 provided with a sealing ring 251 is slidably housed within sleeve 221. Piston 250 defines the lower boundary of the space 241. A second piston 252, likewise provided with a sealing ring 253 is slidably housed within the sleeve 235. A rod 255 is threadedly attached in one end to the piston 250 and extends through the bore 224 in plug member 223 and is threadedly connected to the piston 252. A second rod 256 is threadedly connected to the piston 252 and extends downwardly through bore 237 in plug member 236 and terminates in the space defined in the lower cap 238. Its lower end is threaded and receives nuts 257. A compression spring 260, serving as a bias means, is located between the piston 252 and the plug 236. Whereas a compression spring 260 is shown, it will be appreciated that a tension spring could just as well be employed for this purpose. In this case, the tension spring would be positioned in space 241 and connected to piston 250 and the top of cap 220.

The space 241 is equal in volume to the spaces within the sensing and indicating units and space 230.

When the system experiences a temperature increase, the fluid in the closed system comprised of units 200 and 204, lines 201 and 203 and space 230 will expand requiring additional volume. At the same time, the fluid in the temperature line 208 and 241 will expand since it experiences the same temperature increase. Expansion of fluid in space 241 creates a downward force on piston 250 to move same downward by overcoming the bias of spring 260. This increases the volume of space 241. Since the pistons 250 and 252 are interconnected by rod 255, the piston 252 will follow the movement of piston 250 and the volume of space 230 will be increased, compensating for the increase in fluid volume due to the temperature increase. When the temperature drops, the fluid in the temperature line 208 and space 241 will contract and spring 260 will raise the piston system thereby reducing the volume of space 230. The increase and decrease in the volume of space 230 compensates the closed hydraulic system for expansion and contraction of the hydraulic fluid due to temperature variations.

From the foregoing description, it should be apparent that the invention provides a closed hydraulic system in which means are provided for automatically compensating for the thermo expansion and contraction of the fluid. It is of interest that the device illustrated herein may be further modified in the construction and arrangement of several parts and still obtain the desired compensation or corrected action within the teachings of the invention and without departing from the scope of the appended claim and that the unit may find use as a control in numerous devices.

What is claimed is:

A temperature compensator for the closed hydraulic servo system where the entire system is subject to changes in ambient temperature, said system comprising an input end having a sensing unit, an output end having an indicating unit adapted to indicate changes in pressure within the system due to the differential application of pressure to said input end, said input and output ends being interconnected by means of a hydraulic fluid line, a first variable volume chamber connected to said line, a first sleeve connected to said first chamber, a first piston slidably mounted in said first sleeve and defining a boundary of said first chamber, said hydraulic fluid line and said first chamber being filled with hydraulic fluid and constituting a first closed hydraulic circuit, a second variable volume chamber, a second sleeve connected to said second chamber, a second piston slidably mounted in said second sleeve and defining a boundary of said second chamber, a temperature line connected to said second chamber and extending therefrom for a predetermined distance, said temperature line and said second chamber being filled with hydraulic fluid and constituting a second closed hydraulic circuit, and a piston rod interconnecting said first and second pistons, said pistons being mounted on said piston rod such that the effective volumes of their respective chambers will vary in a direct relationship.

References Cited in the file of this patent
UNITED STATES PATENTS

| | | |
|---|---|---|
| Re. 21,482 | Martin | June 11, 1940 |
| 2,088,032 | Noble | July 27, 1937 |
| 2,260,401 | Rophael | Oct. 28, 1941 |
| 2,601,777 | Woodward | July 1, 1952 |
| 2,645,121 | Scott | July 14, 1953 |
| 2,696,111 | Conner | Dec. 7, 1954 |